United States Patent [19]

Uno et al.

[11] Patent Number: 5,356,747
[45] Date of Patent: Oct. 18, 1994

[54] TONER FOR DEVELOPING ELECTROSTATIC IMAGE AND PROCESS FOR PRODUCTION THEREOF

[75] Inventors: Mikio Uno, Kanagawa; Takashi Shintaku, Tokyo; Takatsugu Takehara, Kanagawa, all of Japan

[73] Assignee: Mitsubishi Kasei Corporation, Tokyo, Japan

[21] Appl. No.: 29,612

[22] Filed: Mar. 11, 1993

[30] Foreign Application Priority Data

Mar. 11, 1992 [JP] Japan .................................. 4-052784
Dec. 2, 1992 [JP] Japan .................................. 4-323365

[51] Int. Cl.$^5$ ............................................. G03G 9/09
[52] U.S. Cl. ................................... 430/109; 430/137
[58] Field of Search ............... 430/106, 107, 109, 137

[56] References Cited

U.S. PATENT DOCUMENTS 3,909,218 9/1975 Yamawaki et al. ................. 106/285
5,256,516 10/1993 Winnik et al. ....................... 430/110

FOREIGN PATENT DOCUMENTS 0370490 5/1990 European Pat. Off. .
2142858 5/1990 Japan .
2103561 7/1990 Japan .
2291568 12/1990 Japan .
3135431 6/1991 Japan .
3193129 8/1991 Japan .

*Primary Examiner*—John Goodrow
*Attorney, Agent, or Firm*—Sughrue, Mion, Zinn, Macpeak & Seas

[57] ABSTRACT

A novel toner for developing electrostatic images is disclosed, which comprises at least a resin and a granulated carbon black having a grain hardness of 2 g or less as starting raw materials blended therein. In addition, a novel process for the production of the novel toner is described.

9 Claims, 6 Drawing Sheets

TONER FOR DEVELOPING ELECTROSTATIC IMAGE AND PROCESS FOR PRODUCTION THEREOF

FIELD OF THE INVENTION

The present invention relates to a toner for developing an electrostatic image for use in electrophotography, electrostatic recording, etc. and a process for the production thereof.

BACKGROUND OF THE INVENTION

In electrophotography using an electronic copying machine or the like, a process has been well known and generally used widely wherein a developer is attached to an image carrier on which an electrostatic image has been formed, such as light-sensitive element, in the development step, transferred from the light-sensitive element to a copying paper in the transfer step, and then fixed on a copying paper in the fixing step. As developers for developing an electrostatic image formed on the latent image retaining surface, there have been known a two-component system developer consisting of a carrier and a toner and a one-component system developer (magnetic toner or nonmagnetic toner) requiring no carrier. The toner contained in these developers is normally made of finely divided colored grains mainly comprising a resin, a coloring material, etc. Toners are also divided into two groups, i.e., positively chargeable toner and negatively chargeable toner. As materials for providing the toners with positive or negative chargeability, there have heretofore been known general static electrification controlling agents, coating agents for providing the carriers with desired chargeability, etc.

As a process for the preparation of toner grains, there has been known a process which comprises blending various components such as binder resin and coloring material in proper amounts, kneading the mixture by a kneader or the like, cooling the material, grinding the material, and then sorting the material.

As a coloring material for black toner there is normally used powdered carbon black. However, the use of powdered carbon black is disadvantageous in that when the starting material of toner is handled in the process for the preparation of toner, much carbon black fly up, contaminating the body of the workers and polluting the circumstances of the workshop.

In order to eliminate these difficulties, the use of dry or wet process granular carbon black obtained by roll-granulation process has been proposed. For example, JP-A-2-291568 (The term "JP-A" as used herein means an "unexamined published Japanese patent application") discloses a toner obtained by dispersing in a binder resin a granular carbon black having a grain size distribution of 140 μm to 840 μm and a bead hardness of 5 to 40 g. However, when kneaded by an ordinary method, such a granular carbon black cannot sufficiently get loose, causing maldispersion. Such a granular carbon black is also disadvantageous in that it doesn't have a proper stability in static electrification, causing image instability upon continuous copying or toner flying in the copying machine.

On the other hand, the use of carbon black masterbatched with a resin has been proposed. However, this approach leaves much to be desired due to the flying of carbon black upon masterbatching or complicated producing procedure (productivity drop).

SUMMARY OF THE INVENTION

It is therefore an object of the present invention to provide a toner comprising a carbon black which enables the reduction of the pollution of the working environment upon the production of toner and facilitates the handling of the toner during storage and transportation and a process for the production thereof.

It is another object of the present invention to provide a toner comprising a resin, a carbon black and other additives highly stably dispersed therein and a process for the production thereof.

It is a further object of the present invention to provide a toner which provides a high image density stability upon continuous copying and printing and causes invariably little fogging and little toner flying and a process for the production thereof.

These and other objects of the present invention will become more apparent from the following detailed description and examples.

As a result of extensive studies, the inventors have found that these objects of the present invention are accomplished by the use of a properly granulated specific carbon black which has been adjusted for desired hardness, density and crushability (dispersibility).

In other words, the present invention provides a toner for developing electrostatic images obtained by blending at least a resin and a granulated carbon black having a grain hardness of 2 g or less as starting raw materials.

BRIEF DESCRIPTION OF THE DRAWINGS

By way of example and to make the description more clear, reference is made to the accompanying drawings in which.

DETAILED DESCRIPTION OF THE INVENTION

The present invention will be further described hereinafter.

As the resin component to be incorporated in the toner of the present invention, there can be used various known materials suitable for toner for developing electrostatic images.

Examples of such known materials include styrene resins (including homopolymer or copolymer containing styrene type or styrene-substituted compound) such as polystyrene, chloropolystyrene, poly-α-methylstyrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylic ester copolymer (e.g., styrene-acrylic methyl copolymer, styrene-acrylic ethyl copolymer, styrene-acrylic butyl copolymer, styrene-acrylic octyl copolymer, styrene-acrylic phenyl copolymer), styrene-methacrylic ester copolymer (e.g., styrene-methacrylic methyl copolymer, styrene-methacrylic ethyl copolymer, styrene-methacrylic butyl copolymer, styrene-methacrylic phenyl copolymer), styrene-α-chloroacrylic methyl copolymer and styrene-acrylonitrile-acrylic ester co-polymer; vinyl chloride resins; rosin-modified maleic resins; phenolic resins; epoxy resins; polyester resins; low molecular weight polyethylenes; low molecular polypropylenes; ionomer resins; polyurethane resins; silicon resins; ketone resins; ethylene-ethyl acrylate copolymers; xylene resins; and polyvinyl butyral resins. Particularly preferred examples of resins which can be used in the present invention include styrene type resins, saturated or unsaturated polyester resins, and epoxy resins. These resins can be used singly or in combination.

Besides these resins, crosslinked binder resins as disclosed in JP-B-51-23354 (The term "JP-B" as used herein means an "examined Japanese patent publication" and JP-A-50-44836, and non-crosslinked binder resins as disclosed in JP-B-55-6895 and JP-B-63-32180 can be used taking into account its fixability and the durability of the developer. In the light of the fixability and mechanical strength of the toner, it is preferred that the resin contained in the toner thus formed exhibits a molecular weight distribution made of low molecular weight distribution given by viscous components and high molecular weight distribution given by elastic components to provide separate functions.

In particular, in the case where styrene type resins are used, when subjected to gel permeation chromatography (hereinafter referred to as "GPC"), it is preferred that the toner exhibits one or more low molecular weight peaks representative of low molecular weight compound as binder resin positioned at 3,000 to 50,000, preferably 4,000 to 30,000, and one or more high molecular weight peaks or shoulders representative of high molecular weight compound positioned at 80,000 to 2,000,000, preferably 100,000 to 1,500,000 (The position of peak and shoulder will be hereinafter referred to as "Lp" and "Hp").

If Lp of the low molecular weight compound is lower than 3,000, it exhibits an excellent fixability but the toner is excessively spent and subject to fine division in the developing tank, deteriorating the image quality and shortening the life of the developer. On the contrary, if Lp of the low molecular weight compound is higher than 50,000, the toner exhibits a poor fixability at a low temperature range and a lowered cold offset temperature.

If Hp of the high molecular weight compound is lower than 80,000, the toner exhibits an excellent fixability but is apt to cause hot offset, disadvantageously narrowing the allowable operating temperature range. On the contrary, if Hp of the high molecular weight compound is higher than 2,000,000, the toner exhibits a poor fixability at a low temperature range, disadvantageously raising the lower limit of fixing temperature.

The flow softening temperature of the toner preferably ranges from 80° C. to 150° C. If the flow softening temperature of the toner falls below 80° C., the fixing temperature of the toner upon heat roll fixing is low, but the toner is apt to cause hot offset and the toner is crushed in the developing tank and is subject to "spent" phenomenon in which it is accumulated on the surface of the carrier due to fusion or the like, causing nonuniformity in the charge distribution and drop in chargeability and hence deteriorating the durability of the developer. On the contrary, if the flow softening temperature is higher than 150° C., the fixing temperature is disadvantageously high.

The glass transition temperature of the toner is preferably 50° C. or higher. If the glass transition temperature is lower than 50° C., the toner is susceptible to agglomeration or fixing when allowed to stand at an elevated temperature as high as 40° C. for a prolonged period of time.

Explanation of Measuring Method

Molecular Weight by GPC

The toner is uniformly dispersed and dissolved in tetrahydrofuran (THF), and then filtered by suction through a Buchner funnel having a dense filter made of Celite to remove insoluble matters in THF therefrom. The soluble matters in THF as filtrate is then measured for molecular weight distribution by GPC under the following conditions. From the calibration curve given by several kinds of monodisperse polystyrene reference specimens, the molecular weight of resins are determined.

Solvent: THF
Specimen flow rate: 1 ml/min.
Specimen concentration: 0.4 gr/dl∼THF
Specimen pour: 8 mg in terms of solution
Reliability: confirmed by observing when Mw/Mn of NBS706 polystyrene reference specimen (Mw=28.8×10$^4$; Mn=13.7×10$^4$; Mw/Mn =2.11) reaches 2.11±0.10

Flow Softening Temperature

The flow softening temperature of the toner is determined by the temperature corresponding to the middle point of the amount (distance) of descent of plunger when measured by means of Type CFT-500 flow tester available from Shimadzu Corp.
Amount of specimen: 1 g
Pressure: 20 kg/cm$^2$
Die: hole diameter: 0.99 φ
height: 1 mm
Plunger: 1 cm$^2$
Rate of temperature rise: 6° C./min.

Glass Transition Temperature

The glass transition temperature of the toner is determined by the transition initiating temperature (inflection point) measured by a thermal analysis apparatus such as commercial differential thermal analysis apparatus and differential scanning calorimeter.
Thermal Analysis Apparatus: DTA-40 available from Shimadzu Corp.
Rate of temperature rise: 10° C./min.

As the binder resin to be incorporated in the toner suitable for the reduction of energy required for fixing (reduction of power consumption and pressure between heat rolls upon fixing) there may be preferably used a resin optimally designed taking into account the aforementioned optimum specifications. When used in combination with the granulated carbon black of the present invention, such a resin serves to make an effective contribution to the improvement of the properties of the toner.

In other words, when the energy required for fixing is reduced, the viscosity and mechanical strength of the resin tend to be reduced, making it difficult to shear itself upon kneading and hence making the various additives less dispersible therein. It can therefore be presumed that the use of the granulated carbon black of the present invention provides a proper shear upon kneading and an excellent dispersibility, even combined with various additives, making the toner less susceptible to deterioration of properties.

Figure 8:
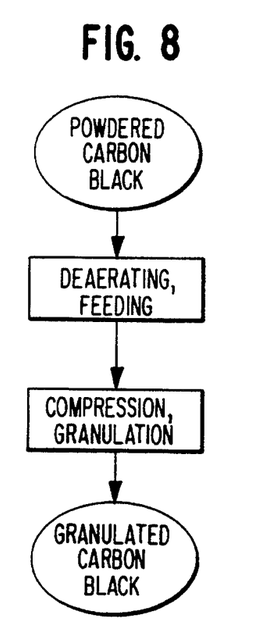
FIG. 8 illustrates an example of the flow chart of production of granulated carbon black.

The granulated carbon black to be used in the present invention can be prepared by granulating powdered carbon black as starting material. The starting material of granulated carbon black is not specifically limited so far as it is an ordinary powdered carbon black. In order to obtain a carbon black having a specific hardness to be used in the present invention, a compression granulation method using a compression granulation apparatus such as roll compression molding press as disclosed in JP-A-2-142858 and JP-A-3-193129 may be preferably used. In other words, a compression-granulated carbon black prepared by a process which comprises deaerating powdered carbon black as starting material through a feeding zone provided with a deaerating mechanism, and then feeding the material into a granulation zone having compression granulation rolls to granulate the material (an example of production flow is shown in FIG. 8) is preferably used. The material and shape of the surface of the compression granulation roll can be arbitrarily selected. Further, the compression granulation roll may be optionally configured in the form of filter cylinder such that a deaeration mechanism by internal suction is provided. As the powdered carbon black to be used as starting material, there may be preferably used one having a BET specific surface area of 50 to 500 m$^2$/g and a dibutyl phthalate (DBP) oil absorption of 30 to 150 ml/100 g.

The load under which the carbon black as starting material is compressed may be properly selected such that the granulated carbon black thus compressed exhibits an average hardness of 2 g or less, preferably 0.1 to 1 g, and a coarse packing bulk density of 0.1 to 0.5 g/cm$^3$, preferably 0.15 to 0.45 g/cm$^3$ taking into account the bulk density and grain diameter of starting material. If the coarse packing bulk density falls below 0.1 g/cm$^3$, much carbon fly during working. Further, since the bulk of the starting material is too large, it can hardly be sheared, hence deteriorating the dispersibility thereof and the properties of the toner.

On the contrary, if the coarse packing bulk density exceeds 0.5 g/cm$^3$, the handleability of carbon is good, but the cohesive force of carbon increases too much, making it impossible to obtain sufficient dispersibility during kneading and hence deteriorating the properties of the toner.

Further, the use of the granulated carbon black having a grain hardness of 2 g or less according to the present invention provides good improvements in the stability of image density during continuous copying and printing, fog stability and inhibition of toner flying.

Test Method a. The coarse packing bulk density was determined in g/cm$^3$ by the method for the measurement of apparent specific gravity of granulated carbon black in accordance with JISK6221.
b. The hardness of granulated grain was determined in g by the method for the measurement of hardness of granulated carbon black in accordance with JISK6221 (specifically described in JP-A-3-193129, line 2 on page 17–line 6 on page 18). c. The ultraviolet absorbency of the carbon black to be used in the present invention can advantageously be in the range 0.05 or less, preferably 0.04 or less, to provide excellent electrostatic properties.

The ultraviolet absorbency ($\Xi c$) of the carbon black is determined as follows. 3 g of carbon black is sufficiently dispersed and mixed in 30 ml of toluene. The mixture is then filtered through No. 5C filter paper. The absorbency ($\Xi s$) of the filtrate at a wavelength of 336±5 nm is measured by means of a commercial ultraviolet spectrophotometer. (The specimen is charged in a quartz cell having a 1 cm × 1 cm absorption unit.) The absorbency ($\Xi o$) of toluene as reference is measured in the same manner. The ultraviolet absorbency is determined by calculating $\Xi c = \Xi s - \Xi o$.

An example of such a commercial spectrophotometer is Type UV-3100PC ultraviolet and visible spectrophotometer available from Shimadzu Corp.

Further, for the purpose of surface modification, the carbon black may be optionally subjected to surface treatment with metal soap or the like. Untreated carbon black and surface-treated carbon black may be used in combination. Alternatively, the granulated carbon black of the present invention can be used in combination with powdered carbon black, different kinds of carbon black (e.g., those having great grain size and small grain size, those having different pH, i.e., acidic and alkaline), other coloring agents (e.g., dye, pigment), etc.

The content of such a coloring agent may be such that it is enough to color the toner so as to form a visible image upon development. The content of the coloring agent is preferably in the range of 1 to 20 parts by weight, more preferably 3 to 15 parts by weight based on 100 parts by weight of resin.

In a case of a black toner, the content of a carbon black is 90 wt % or more, preferably 95 wt % more, in the content of the coloring agent. In a case of the other color toners, a carbon black and the other coloring agent(s) are used in combination to adjust a desired color.

The toner of the present invention may contain a known chargeability controlling agent such as nigrosine dye, quaternary ammonium salt, triaminotriphenylmethane compound and imidazole compound, if it is a positively chargeable toner, or a known chargeability controlling agent such as metal-containing azo dye, salicylic metal compound and alkylsalicylic metal compound, if it is a negatively chargeable toner, for the purpose of adjusting the chargeability thereof. The amount of such a chargeability controlling agent to be added is preferably in the range of 0.05 to 10 parts by weight based on 100 parts by weight of resin.

Further, the toner of the present invention can comprise auxiliaries such asvarious plasticizers and mold lubricants incorporated therein for the purpose of adjusting the thermal properties and physical properties thereof. The amount of such an auxiliary to be added is preferably in the range of 0.1 to 10 parts by weight based on 100 parts by weight of resin.

Moreover, the toner grains may comprise finely divided grains of titania, alumina, silica or the like so that they are covered therewith to improve the fluidity and cohesion resistance thereof. The amount of such finely divided grains to be added is preferably in the range of 0.05 to 5 parts by weight based on 100 parts by weight of toner grains.

If the toner of the present invention is used for a two-component system developer, it may be used in admixture with a magnetic carrier. The content proportion of carrier to toner in the developer is preferably in the range of 100: 1 to 100: 10 by weight. As such a magnetic carrier there can be used a known material such as iron powder, ferrite powder, magnetite powder and magnetic resin powder each having a grain diameter of 30 to 200 Ξm. Such a magnetic carrier may be preferably coated with a known silicon resin, acrylic resin, fluorine resin or a mixture thereof.

Figure 7:
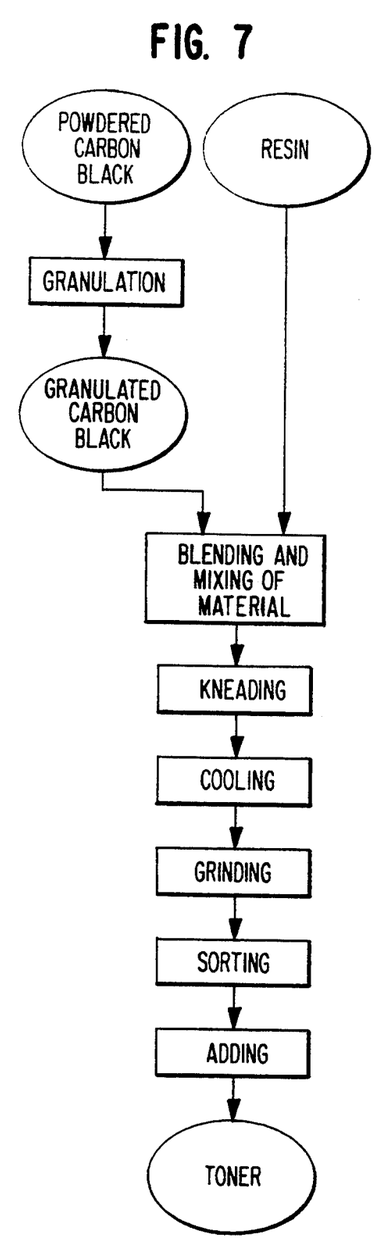
FIG. 7 illustrates an example of the flow chart of toner production.

The toner of the present invention may be used as a magnetic one-component system toner which is a carrier-free one-component system developer containing a magnetic material such as magnetite or as a nonmagnetic one-component system toner free of magnetic material. The preparation of the toner grains of the present invention can be accomplished by various toner preparation methods which have heretofore been employed. Examples of such toner preparation methods include those described hereinafter. An example of flow chart of toner preparation is shown in FIG. 7.

Specifically, a resin, a coloring material, a chargeability controlling agent, etc. are uniformly dispersed by means of a known mixer. The dispersion may be melt-kneaded by means of an enclosed kneader or monoaxial or biaxial extruder, cooled, ground, and then sorted.

The granulated carbon black having a specific hardness to be incorporated in the toner of the present invention gets loose and is then dispersed in the molten resin during this kneading procedure. The state of being loose as used herein indicates that the carbon black is observed in a form near to powder rather than granulated form under an optical microscope.

As the kneading machine in the case where the granulated carbon black of the present invention is used as starting material, there may be used either a batch kneader (e.g., pressure kneader, Banbury mixer) or a continuous kneader. In particular, if the continuous kneader is used, the present invention can effectively work.

As such continuous kneaders, there have been mainly used monoaxial or biaxial extruders in recent years. Preferred examples of such continuous kneaders include Type KTK biaxial kneader available from Kobe Steel, Ltd., Type TEM biaxial extruder available from Toshiba Machine Co., Ltd., biaxial extruder available from K.C.K. Co., Type PCM biaxial extruder available from IKEGAI CORP., and co-kneader available from Bus Corp. The average grain diameter of the toner is preferably in the range of 3 to 20 μm. If the toner is to be further provided with additives, a sorted toner and additives may be mixed with stirring by means of a high speed stirrer or the like.

The present invention will be further described in the following examples, but the present invention should not be construed as being limited thereto. The term "parts" as used herein indicates "parts by weight".

EXAMPLE 1

| | |
|---|---|
| Styrene/n-butyl acrylate (82/18 monomer weight ratio) copolymer resin (flow softening point 130° C.; glass transition point: 62° C.) | 100 parts |
| Coloring agent: Carbon black MA7F (available from Mitsubishi Kasei Corp.; granulated type) | 5 parts |
| Electrostatic controlling agent: Bontron P51 (available from Orient Chemical Co., Ltd.; quaternary ammonium salt) | 2 parts |
| Low molecular weight polypropylene: Biscol 550P (Sanyo Chemical Co., Ltd.) | 2 parts |

The above mentioned components were blended, kneaded by means of a continuous biaxial extruder, ground, and then sorted to obtain a black toner having an average grain diameter of 10 μm. To 100 parts of the black toner were added 0.2 parts of silica powder (R972 available from Nihon Aerogel K.K.) by means of a Henscheil mixer to obtain toner A. 4 parts of the toner A thus obtained and 100 parts of a ferrite powder carrier having an average grain diameter of m coated with a methyl silicon-containing resin were mixed with stirring to prepare a developer.

Using a copying machine having an organic photoconductor as a photoreceptor, the developer thus obtained was subjected to a practical copying test with 100,000 sheets of copying paper under high temperature and humidity conditions of 40° C. and 85 to 90% RH. The toner replenisher used in the practical copying test was the toner A, which has the same composition as used in the developer.

The results of the practical copying test show that even after 100,000 sheets of copying, the toner and developer can provide a high and stable uniformity and density in the black-copied portion and causes little fog increase, which is a stain on the white background, and yet causes little toner flying in the copying machine. This means that the toner and developer can exhibit an excellent resistance under severe conditions of high temperature and humidity.

The carbon black in the black toner A was confirmed to exhibit an excellent dispersion when observed under an optical microscope.

EXAMPLE 2

A toner and a developer were prepared in the same manner as in Example 1, except that the coloring agent used in Example 1 was replaced by #33F (available from Mitsubishi Kasei Corp.; granulated type) as set forth in Table 1. The toner and developer thus prepared were then subjected to a practical copying test with 100,000 sheets of copying paper in the same manner as mentioned above. The results are set forth in Table 1.

EXAMPLE 3

A toner and a developer were prepared in the same manner as in Example 1, except that the toner was prepared by blending the following components:

| | |
|---|---|
| Styrene/n-butyl acrylate (82/18 monomer weight ratio) copolymer resin (flow softening point: 130° C.; glass transition point: 62° C.) | 100 parts |
| Coloring agent: Carbon black MA100F (available from Mitsubishi Kasei | 7 parts |

| | | |
|---|---|---|
| Corp.; granulated type) Electrostatic controlling agent Bontron S34 (available from Orient Chemical Co., Ltd.; chromium-containing dye) | 1 part | |
| Low molecular weight polypropylene: Biscol 550P (Sanyo Chemical Co., Ltd.) | 2 parts | |

Using a copying machine provided with selenium photoreceptor, the developer thus prepared was then subjected to a practical copying test with 100,000 sheets of copying paper under high temperature and humidity conditions of 40° C. and 85 to 90%RH in the same manner as in Example 1. The results are set forth in Table 1. As shown in Table 1, the toner and developer exhibit an excellent resistance under severe conditions of high temperature and humidity.

COMPARATIVE EXAMPLES 1 TO 3

A toner and a developer were prepared in the same manner as in Example 1, except that the coloring agent used in Example 1 was replaced by the carbon black set forth in Table 1. The toner and developer thus prepared were then subjected to a practical copying test with 100,000 sheets of copying paper in the same manner as mentioned above. The results are set forth in Table 1.

COMPARATIVE EXAMPLES 4 AND 5

A toner and a developer were prepared in the same manner as in Example 3, except that the coloring agent used in Example 3 was replaced by the carbon black set forth in Table 1. The toner and developer thus prepared were then subjected to a practical copying test with 100,000 sheets of copying paper in the same manner as mentioned above. The results are set forth in Table 1.

| | | |
|---|---|---|
| Low molecular weight polypropylene: Biscol 550P (Sanyo Chemical Co., Ltd.) | 2 parts | |
| Electrostatic controlling agent: Bontron P51 (available from Orient Chemical Co., Ltd.; quaternary ammonium salt) | 1 part | |

The above mentioned components were blended, kneaded by means of a continuous biaxial extruder, cooled, ground, and then sorted to obtain a black toner a having an average grain diameter of 9.5 μm. To 100 parts of the black toner a were added 0.2 parts of silica powder (R972 available from Nihon Aerogel K.K.) and 0.3 parts of magnetite powder (average grain diameter: 0.3 μm) by means of a Henschell mixer to obtain toner I. 4 parts of the toner I thus obtained and 96 parts of a Cu-Zn ferrite carrier having an average grain diameter of 100 μm and a saturated magnetization of 55 emu/g coated with a methyl silicon-containing resin were mixed with stirring to prepare a developer A.

Using a copying machine having an organic photoconductor as a photoreceptor which employs a heat roll fixing system, a blade cleaning system and a permeability sensor system for controlling the replenishment of toner to the developer in the developing tank and operates in a normal development mode at a copying speed of 50 sheets (A4 size)/min. (photoreceptor surface potential: normal mode DC 700 V, photographic mode DC 500 V, bias voltage DC 200 V), the starting developer A and toner replenisher A thus obtained were subjected to a practical copying test with 50,000 sheets of copying paper under normal temperature and humidity conditions of 23° C. to 25° C. and 50 to 55%RH.

The results of the practical copying test show that even after the copying of 50,000 sheets of copying pa-

TABLE 1

| Example No. | Toner | Brand of carbon black (type) | Coarse packing bulk density (g/cc) | Grain hardness (g) | Handleability of carbon black | Dispersibility of carbon black in toner | Results of practical copying test with 100,000 sheets of copying paper | | |
|---|---|---|---|---|---|---|---|---|---|
| | | | | | | | Image density | Fog stability | Toner flying |
| Example 1 | Toner A | MA7F (granulated) | 0.30 | 0.5 | Excellent | Excellent | Excellent | Extremely excellent | Excellent |
| Example 2 | Toner B | #33F (granulated) | 0.35 | 0.7 | Excellent | Excellent | Excellent | Excellent | Excellent |
| Example 3 | Toner C | MA100F (granulated) | 0.30 | 0.5 | Excellent | Excellent | Excellent | Extremely excellent | Excellent |
| Comparative Example 1 | Toner D | MA7P (powdered) | 0.22 | 0 | Poor | Almost excellent | Excellent | Excellent | Slightly poor |
| Comparative Example 2 | Toner E | MA7B (granulated) | 0.40 | 4 | Excellent | Remarkably poor | Poor | Poor | Remarkably poor |
| Comparative Example 3 | Toner F | #33B (granular) | 0.45 | 10 | Excellent | Remarkably poor | Poor | Poor | Remarkably poor |
| Comparative Example 4 | Toner G | MA100P (powdered) | 0.18 | 0 | Poor | Almost excellent | Excellent | Excellent | Slightly poor |
| Comparative Example 5 | Toner H | MA100B (granular) | 0.37 | 4 | Excellent | Excellent | Poor | Poor | Remarkably poor |

EXAMPLE 4

Figure 1:
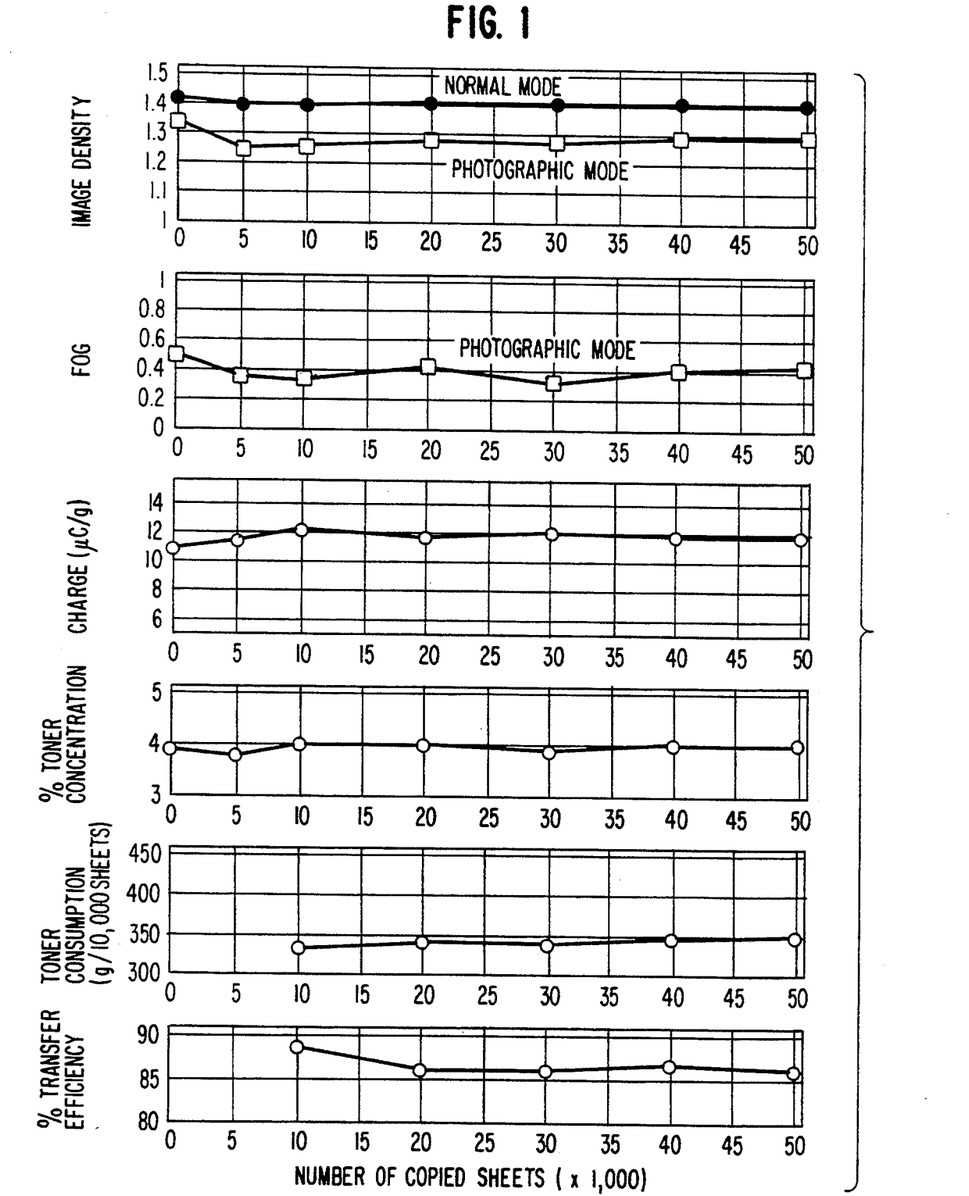
FIG. 1 illustrates the data of a practical copying test of the specimen of Example 4 with 50,000 sheets of copying paper under normal conditions.

| | |
|---|---|
| Styrene/n-butyl acrylate (82/18 monomer weight ratio) copolymer resin (flow softening point: 130° C.; glass transition point: 61° C.) | 100 parts |
| Coloring agent: Carbon black S (granulated) (available from Mitsubishi Kasei Corp.; grain hardness: 0.5 g; UV absorbency: 0.02; BET specific surface area: 130 m$^2$/g; DBP oil absorption: 100 ml/100 g; pH 3; bulk density: 0.28 g/cc) | 6 parts | per, the toner and developer provides a high and stable copy image density and causes no fog increase as stain on the copy white background and little toner flying, giving no stain in the copying machine. Thus, the toner and developer exhibits an excellent durability and copy image stability even after continuous copying. The results of practical copying test under normal conditions are shown in FIG. 1.

Figure 3:
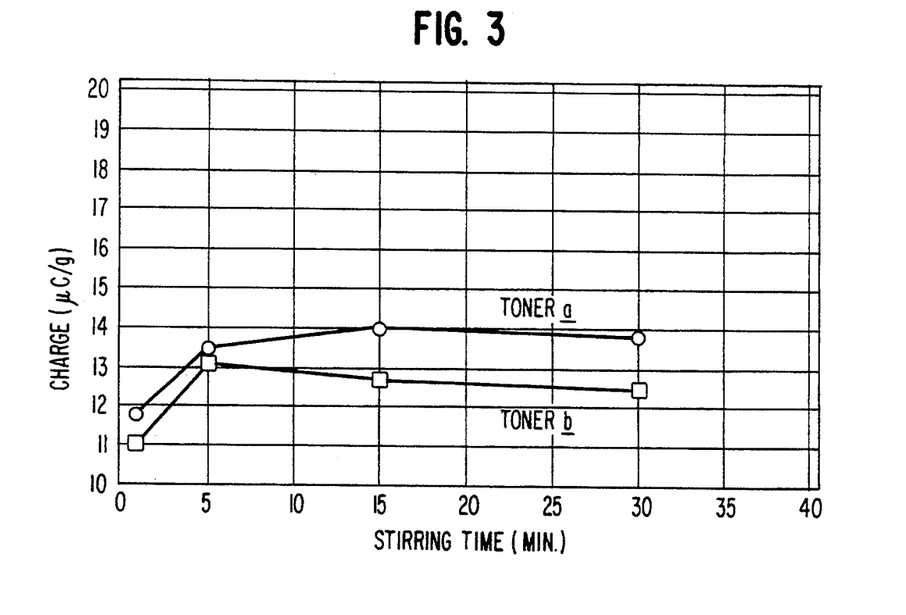
FIG. 3 illustrates the chargeability rising properties of the toner a of Example 4 and the toner b of Example 5.

The chargeability rising properties of the toner a were excellent as shown in FIG. 3.

EXAMPLE 5

| | |
|---|---|
| Coloring agent: carbon black N (granulated) (available from Mitsubishi Kasei Corp.; grain hardness: 0.5 g; UV absorbency: 0.10; BET specific surface area: 130 m$^2$/g; DBP oil absorption 100 ml/ 100 g; pH 3; bulk density: 0.28 g/cc) | 6 parts |

A toner b was prepared in the same manner as in Example 4, except that the coloring agent was replaced by the above mentioned material. To the toner b were then added additives to prepare toner J. To the toner J were then added a carrier with stirring to obtain a developer B. The toner J and the developer B were then subjected to a practical copying test with 50,000 sheets of copying paper under normal conditions in the same manner as in Example 4.

Figure 2:
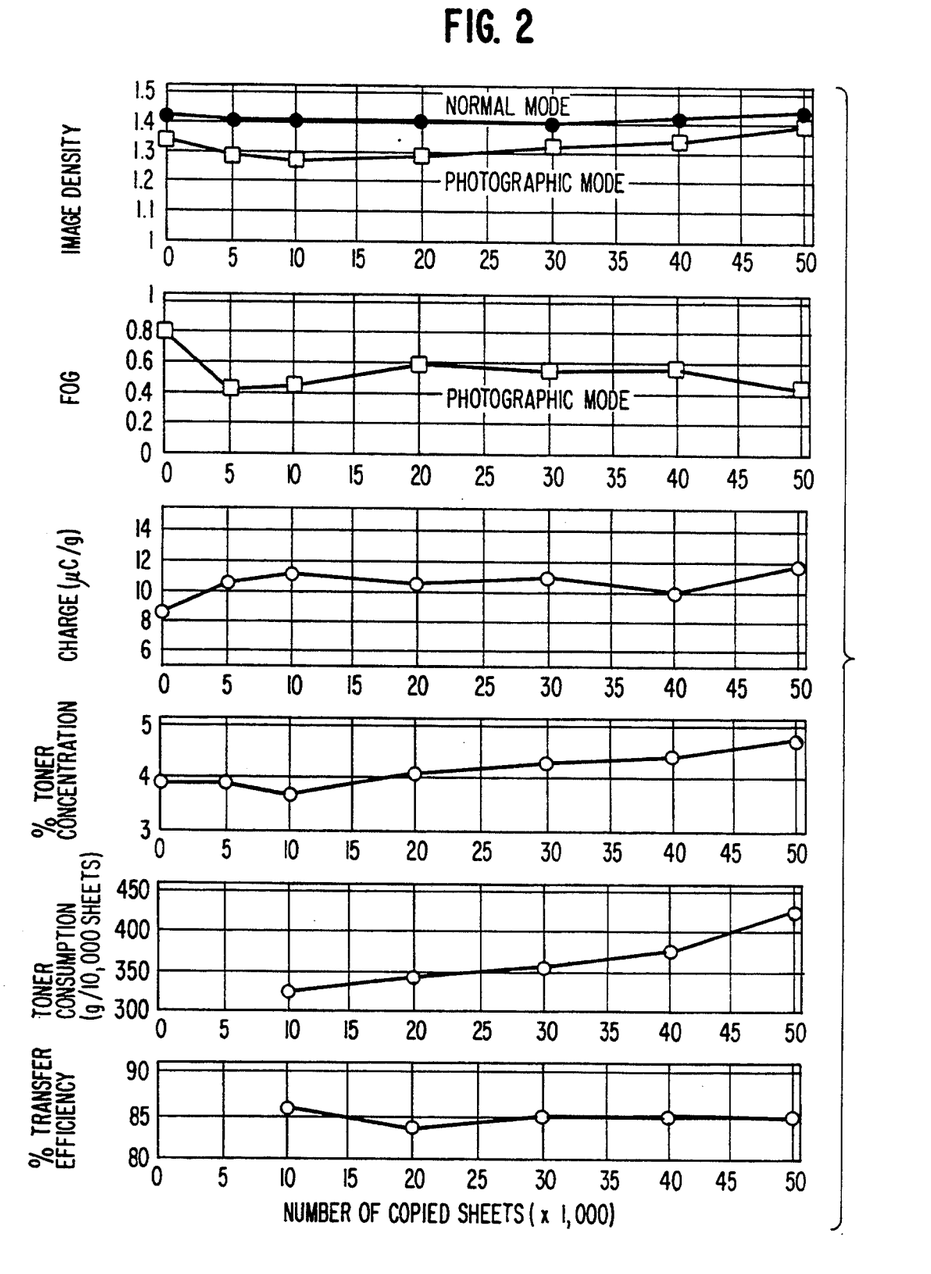
FIG. 2 illustrates the data of a practical copying test of the specimen of Example 5 with 50,000 sheets of copying paper under normal conditions.

As a result, the toner a provides a better image density stability in the photographic mode, a lower initial fog, and a less flying of the toner accumulated on the bottom of the developing tank than the toner b (the amount of toner flying in Example 5 was about four times that in Example 4). The toner a is also slightly better than the toner b in the transfer efficiency and the durability and stability of copy image quality during copying. The results of practical copying test of the toner b under normal conditions are shown in FIG. 2.

Further, the chargeability rising properties of the toner b is slightly poorer than the toner a (see FIG. 3).

EXAMPLE 6

| | |
|---|---|
| Styrene/n-butyl acrylate (85/15 monomer weight ratio) copolymer resin (flow softening point: 128° C.; glass transition point: 60° C.) | 100 parts |
| Coloring agent: Carbon black S (granulated) (available from Mitsubishi Kasei Corp.; grain hardness: 0.5 g; UV absorbency: 0.02; BET specific surface area: 130 m$^2$/g; DBP oil absorption: 100 ml/100 g; pH 3; bulk density: 0.28 g/cc) | 6 parts |
| Low molecular weight polypropylene: NP-505 (Mitsui Petrochemical Industries, Ltd.) | 2 parts |
| Electrostatic controlling agent: Bontron S51 (available from Orient Chemical Co., Ltd.; quaternary ammonium salt) | 1 part |

The above mentioned components were blended, kneaded by means of a large-sized continuous biaxial extruder, cooled, ground, and then sorted to obtain a black toner c having an average grain diameter of 9.0 μm. To 100 parts of the black toner c were added 0.3 parts of silica powder (R972 available from Nihon Aerogel K.K.) and 0.3 parts of magnetite powder (average grain diameter: 0.3 μm) by means of a Henscheil mixer to obtain toner K. 4 parts of the toner K thus obtained and 96 parts of a Cu-Zn ferrite carrier having an average grain diameter of 100 μm and a saturated magnetization of 55 emu/g coated with a methyl silicon-containing resin were mixed with stirring to prepare a developer C. The toner and developer were then subjected to a practical copying test with 50,000 sheets of copying paper under normal conditions in the same manner as in Example 4.

The results of the practical copying test show that the toner and developer exhibits an excellent durability and copy image stability as in Example 4. The results of practical copying test are shown in FIG. 4.

Figure 4:
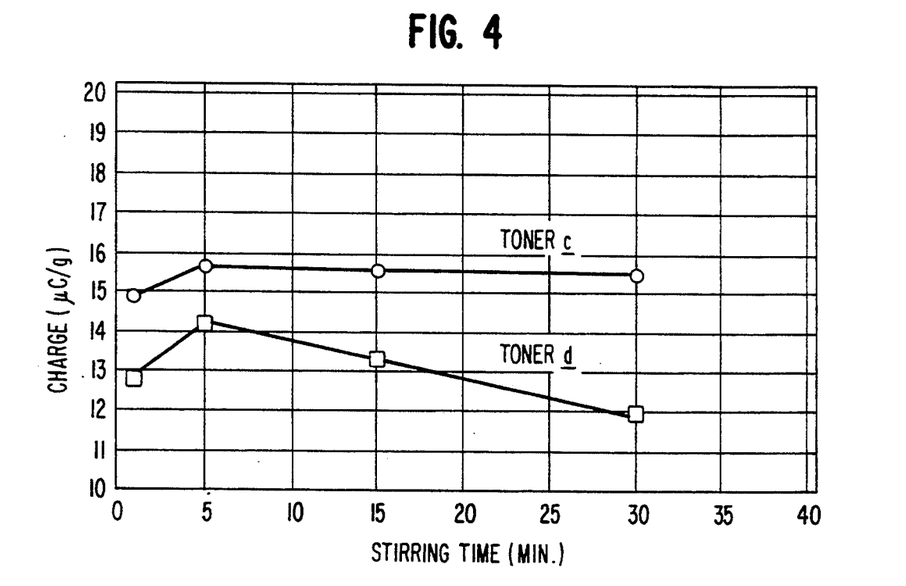
FIG. 4 illustrates the chargeability rising properties of the toner c of Example 6 and the toner d of Example 7.
Figure 5:
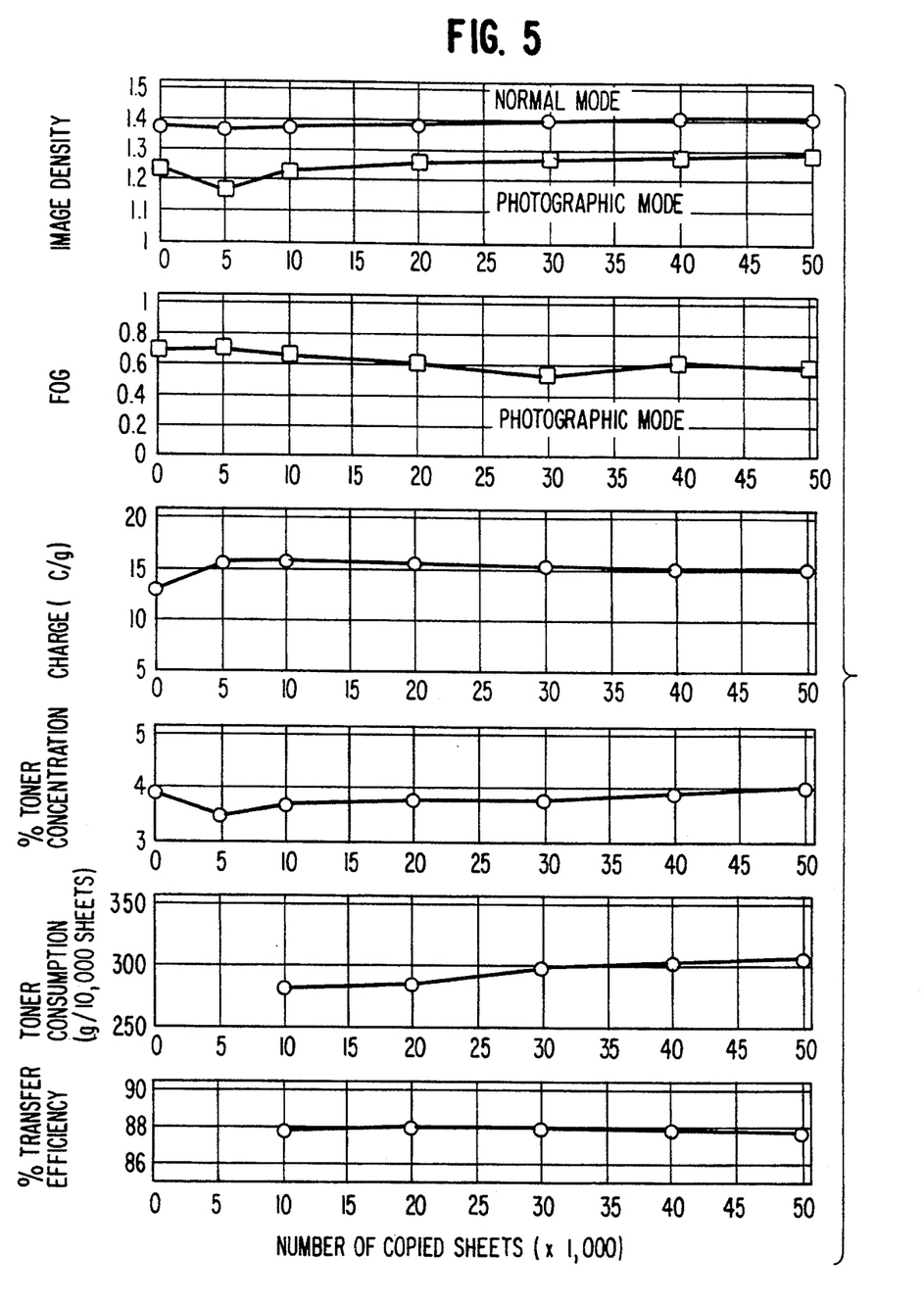
FIG. 5 illustrates the data of a practical copying test of the specimen of Example 6 with 50,000 sheets of copying paper under normal conditions.

The chargeability rising properties of the toner c were excellent as shown in FIG. 4.

EXAMPLE 7

| | |
|---|---|
| Coloring agent: carbon black N (granulated) (available from Mitsubishi Kasei Corp.; grain hardness: 0.5 g; UV absorbency: 0.10; BET specific surface area: 130 m$^2$/g; DBP oil absorption: 100 ml/ 100 g; pH 3; bulk density: 0.28 g/cc) | 6 parts |

A toner d was prepared in the same manner as in Example 6, except that the coloring agent was replaced by the above mentioned material. To the toner d were then added additives to prepare toner L. To the toner L were then added a carrier with stirring to obtain a developer D. The toner L and the developer D were then subjected to a practical copying test with 50,000 sheets of copying paper under normal conditions in the same manner as in Example 6.

Figure 6:
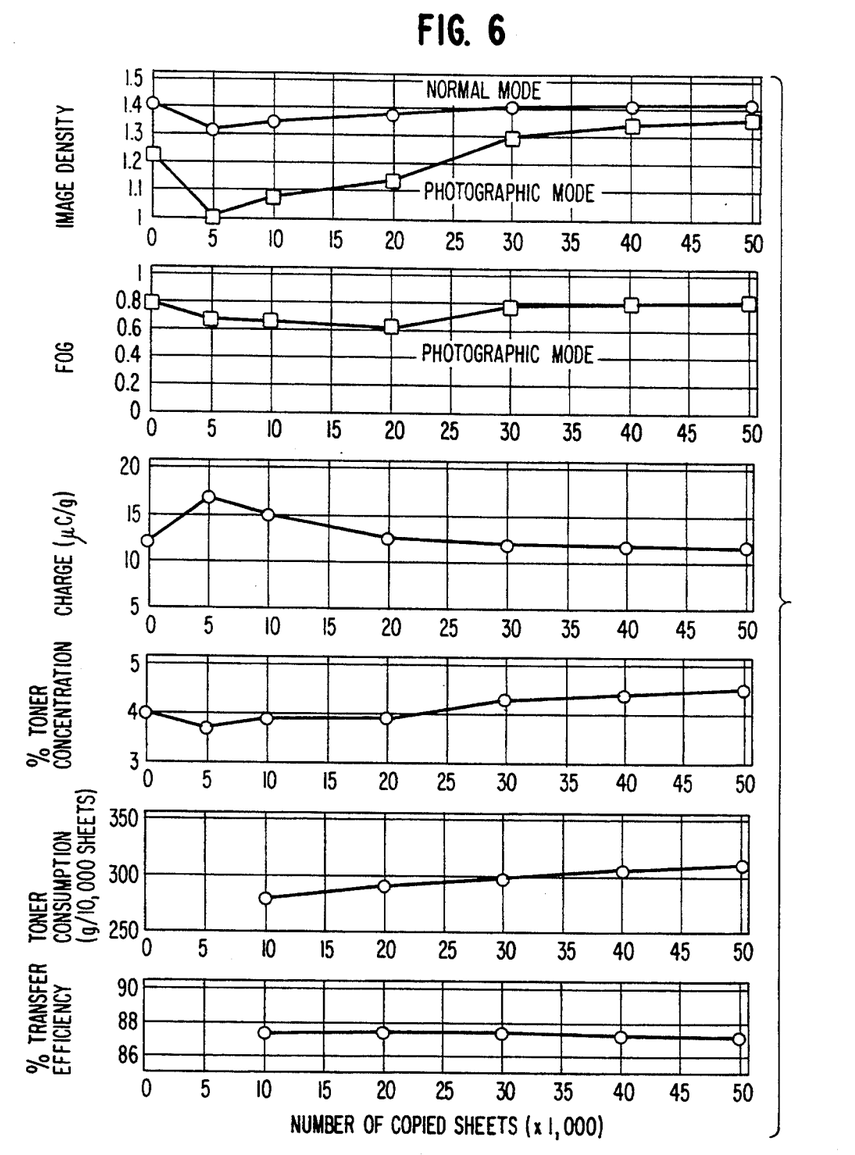
FIG. 6 illustrates the data of a practical copying test of the specimen of Example 7 with 50,000 sheets of copying paper under normal conditions.

The results of the practical copying test show that the toner d exhibits a greater image density change in the photographic mode and a slightly more flying of the toner which has been accumulated on the bottom of the developing tank than the toner c. Further, the toner d exhibits a slightly poorer transfer efficiency than the toner c. The toner d leaves something to be desired in durability and copy image quality stability upon copying. The results of the practical copying test are set forth in FIG. 6.

The chargeability rising properties of the toner d show a tendency to fall from a certain point and thus are poorer than that of the toner c.

BRIEF DESCRIPTION OF MEASURING METHODS

Image Density

Measured on the black portion on which an image has been formed by means of a Macbeth reflection densitometer.

Fog

The stain on the white background on which no image has been formed is measured as Hunter whiteness (Wb) before and after practical copying test by means of a color difference meter available from NIPPON-DENSO CO., LTD. The fog is determined by the difference of Wb between before and after the test.

Toner Charge

The developer is sampled and measured by means of a blow-off charge meter available from Toshiba Chemical Co., Ltd.

Toner Concentration

The developer is sampled. The toner is removed from the sample. The toner concentration is determined by gravimetric analysis.

Toner Consumption

The weight of the toner replenishment apparatus in which the toner replenisher is charged is measured. The toner consumption is determined by the change in the weight.

Transfer Efficiency

The toner on the photoreceptor is caught by a blade cleaner into a toner recovery unit. The weight of the toner recovery unit is measured. The toner recovery is determined by the weight change. The toner transfer efficiency is determined by the following equation:

$$\text{Transfer efficiency (\%)} = \frac{(\text{Toner consumption} - \text{Toner recovery})}{\text{Toner consumption}} \times 100$$

Chargeability Rising Properties 4 parts of the toner and 96 parts of a ferrite carrier (F-100 available from Powdertech Co.) are mixed with stirring under normal conditions. The toner charge is measured by means of a blow-off charge meter available from Toshiba Chemical Co., Ltd.

Normal Conditions: 23°–25° C. 50–55% RH

The use of the electrostatic image developing toner of the present invention provides remarkable improvements in the working atmosphere during the toner production and causes no deterioration of the dispersibility of carbon black in the toner.

Further, the electrostatic image developing toner of the present invention provides little change in the copy image density, no fog increase and little toner flying during continuous copying regardless of operating conditions. Thus, the toner of the present invention provides a great industrial advantage.

While the invention has been described in detail and with reference to specific embodiments thereof, it will be apparent to one skilled in the art that various changes and modifications can be made therein without departing from the spirit and scope thereof.

What is claimed is:

1. A toner for developing electrostatic images, comprising at least a resin and a granulated carbon black having a grain hardness of 2 g or less as starting raw materials blended therein.

2. The toner for developing electrostatic images according to claim 1, wherein said granulated carbon black is loosely dispersed in said resin.

3. The toner for developing electrostatic images according to claim 1, wherein the coarse packing bulk density of said granulated carbon black is in the range of 0.1 to 0.5 g/cc.

4. The toner for developing electrostatic images according to claim 1, wherein said granulated carbon black is prepared by compression granulation process.

5. The toner for developing electrostatic images according to claim 1, wherein the ultraviolet absorbency of said granulated carbon black is in the range of 0.05 or less.

6. The toner for developing electrostatic images according to claim 1, wherein the grain hardness of carbon black is in the range of 0.1 to 1 g.

7. The toner for developing electrostatic images according to claim 1, wherein said resin is a styrene type resin.

8. A process for the production of a toner for developing electrostatic images, which comprises blending at least a resin and a granulated carbon black having a grain hardness of 2 g or less, and then kneading the mixture.

9. The process according to claim 8, wherein said granulated carbon black is obtained by deaerating at least powdered carbon black, and then compression-granulating the material.

* * * * *